Patented May 18, 1948

2,441,669

UNITED STATES PATENT OFFICE 2,441,669

N-SUBSTITUTED 1-BUTENE-3,4-DIAMINES AND PROCESS FOR PREPARING THEM

Glen H. Morey, Terre Haute, Ind., assignor to Commercial Solvents Corporation, Terre Haute, Ind., a corporation of Maryland No Drawing. Application October 27, 1944, Serial No. 560,715

10 Claims. (Cl. 260—583)

This invention relates to new N-substituted 1-butene-3,4-diamines and to a method for preparing them.

The N-substituted 1-butene-3,4-diamines of my invention have the following general formula

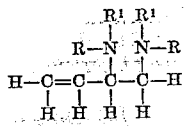

wherein R and $R^1$ may be the same or different and are lower alkyl or alkenyl groups.

Among the new compounds of my invention are included the following: 1-butene-3,4-bis-dimethylamine; 1-butene-3,4-bis-diethylamine; 1-butene-3,4-bis-dibutylamine; 1-butene-3,4-bis-diisobutylamine; 1-butene-3,4-bis-dipropylamine; 1-butene-3,4-bis-diisopropylamine; 1-butene-3,4-bis-diamylamine; 1-butene-3,4-bis-propylbutylamine; 1-butene-3,4-bis-butylamylamine; 1-butene-3,4-bis-ethylhexylamine; 1-butene-3,4-bis-dialkylamine, and the like.

In preparing the N-substituted 1-butene-3,4-diamines of my invention I react 3,4-dichloro-1-butene with a secondary alkyl or alkenyl amine in the proportion of at least four moles of a secondary amine to one mole of dichloro compound. I prefer, however, to use an appreciable excess of secondary amine, for example, 50% excess, that is, a proportion of about six moles or more of secondary amine to one mole of 3,4-dichloro-1-butene to insure conversion of the maximum proportion of dichloro compound to N-substituted 1-butene-3,4-diamine, primarily by providing enough secondary amine both to form the N-substituted diamine compounds and to react with the chlorine liberated from the dichloro compound to form the amine hydrochloride. This use of excess amine serves to prevent undesired side reactions from taking place with incident reduction in the yield of the desired N-substituted 1-butene-3,4-diamines. Moreover, by employing an excess of secondary amine, there is sufficient of the secondary amine to serve as a solvent for the reaction. Other solvents may be used, however, which are inert toward the reactant, and for this purpose hydrocarbons, alcohols, ethers, and the like are suitable. The reaction is preferably initiated at ordinary room temperature. However, the heat of reaction may cause the temperature to rise somewhat and in such cases it is desirable to cool the mixture to maintain the temperature below about 85° C., during the initial stages of the reaction, otherwise, darkening of the reaction mixture may occur and a reduction in yield results. The temperature at which reaction proceeds most favorably varies with the amine used, some amines reacting vigorously with the 3,4-dichloro-1-butene at or below room temperatures so that cooling must be resorted to, to prevent the temperature from rising too high. Other amines react more slowly, so that no cooling is required. Still others may react so slowly at room temperatures that moderate heating will be required to speed up the reaction somewhat.

In any case, even as to the slowly reacting amines, I have found that the temperature of the reaction, in its initial stages, should not exceed about 85° C. for best results, although at higher temperatures, quantities of the desired products will be obtained in somewhat lower yields. After the major part of the reaction has taken place, higher temperatures apparently do no harm, and may even be desirable to bring the reaction to substantial completion.

When the reaction appears to be complete, usually in a matter of several hours, depending somewhat on the temperature of the reaction, an aqueous solution of a strong base such as sodium or potassium hydroxide may be added to the reaction mixture to liberate the excess secondary amine from the hydrogen chloride with which it has combined during the course of the reaction, or, if desired, the crystalline hydrochloride may be filtered off and the remaining N-substituted 1-butene-3,4-diamine crude product may be recovered by vacuum distillation. If the alkali hydroxide is added, this causes the formation of two liquid layers, the lower layer consisting chiefly of water and alkali chloride, the upper layer consisting principally of the desired N-substituted 1-butene-3,4-diamine, together with the excess secondary amine. The two layers are separated; the upper layer containing the crude N-substituted 1-butene-3,4-diamine is fractionated under reduced pressure and the purified product recovered.

My invention may be further illustrated by the following specific examples.

EXAMPLE I

*1-butene-3,4-bis-dipropylamine*

Two moles, 250 parts of 3,4-dichloro-1-butene was added to 12 moles, 1212 parts of dipropylamine in a reaction vessel and allowed to stand. The temperature did not rise above 70° C. After standing overnight, the crystals of amine hydrochloride which formed, were filtered out, and the filtrate was refluxed for a short time, during which additional crystals formed and were filtered out. The reaction mass was then fractionated to remove excess dipropylamine, and the remaining 1-butene-3,4-bis-dipropylamine was rapidly distilled at 5 mm. pressure, resulting in 273 parts of product, corresponding to a yield of 53.8%.

EXAMPLE II

*1-butene-3,4-bis-dibutylamine*

Four moles, 500 parts of 3,4-dichloro-1-butene was mixed with 30 moles, 3870 parts of dibutylamine in a reaction vessel, and allowed to stand at room temperature for two days. Then the large mass of crystals of dibutylamine chloride which had formed were filtered off. The filtrate was heated at 45-50° C. for five hours, and the additional crystals which formed were filtered out. The filtrate was then heated to 80° C. and allowed to stand overnight. Additional crystals formed and were filtered out. Then the residue was fractionated at atmospheric pressure to remove excess dibutylamine. The remaining liquid product amounted to 675 parts, corresponding to a yield 1-butene-3,4-bis-dibutylamine of 53%.

EXAMPLE III

*1-butene-3,4-dibutylamine*

Two moles, 250 parts of 3,4-dichloro-1-butene was mixed with 12 moles of dibutylamine, and allowed to stand at room temperature for twenty-four hours. Then the crystals of dibutylamine chloride which had formed were filtered out and the filtrate was heated to boiling under reflux. During this treatment, an additional quantity of crystals formed and were filtered off, combined with the first batch and were washed with 500 parts of dibutylamine to recover entrained product. The washings were added to the original filtrate. The excess dibutylamine was then fractionated off the filtrate at atmospheric pressure. The remaining liquid was washed substantially free of chlorides and amounted to 317 parts, corresponding to a yield of 1-butene-3,4-bis-dibutylamine of 50%.

The compounds of my invention are useful for a number of organic syntheses and the members containing between 3 to 6 carbon atoms inclusive are useful in insecticidal compositions, particularly when used in sprays for combating flies, mosquitoes, and common agricultural insect pests, as set forth in my co-pending application, U. S. Serial No. 529,667.

While the above describes the preferred embodiments of my invention it will be understood that departures may be made therefrom within the scope of the specification and claims.

What is claimed is:

1. As new compositions of matter N-substituted 1-butene-3,4-diamines having the following formula:

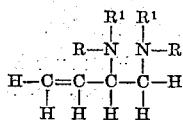

wherein R and $R^1$ are members selected from the group consisting of lower alkyl groups and lower alkenyl groups.

2. 1-butene-3,4-bis-dibutylamine.

3. 1-butene-3,4-bis-dipropylamine.

4. In a method for preparing N-substituted 1-butene-3,4-diamines of the class described, the step which comprises reacting a secondary amine selected from the group consisting of lower dialkylamines and lower dialkenylamines with 3,4-dichloro-1-butene in the proportion of at least 4 moles of diamine per mole of 3,4-dichloro-1-butene.

5. In a method for preparing N-substituted 1-butene-3,4-diamines of the class described, the step which comprises reacting a secondary amine selected from the group consisting of lower dialkylamines and lower dialkenylamines with 3,4-dichloro-1-butene in the proportion of at least 6 moles of diamine per mole of 3,4-dichloro-1-butene.

6. In a method for preparing N-substituted 1-butene-3,4-diamines of the character described, the step which comprises reacting a secondary amine selected from the group consisting of lower dialkylamines and lower dialkenylamines with 3,4-dichloro-1-butene in the proportion of at least 4 moles of disubstituted amine per mole of 3,4-dichloro-1-butene at temperatures not exceeding about 85° C.

7. In a method for preparing N-substituted 1-butene-3,4-diamines of the character described, the step which comprises reacting a secondary amine selected from the group consisting of lower dialkylamines and lower dialkenylamines with 3,4-dichloro-1-butene in the proportion of at least 6 moles of disubstituted amine per mole of 3,4-dichloro-1-butene at temperatures not exceeding about 85° C.

8. In a method for preparing 1-butene-3,4-bis-dibutylamine, the step which comprises reacting 3,4-dichloro-1-butene with dibutylamine in the proportion of at least six moles of dibutylamine per mole of 3,4-dichloro-1-butene.

9. In a method for preparing 1-butene-3,4-bis-dipropylamine, the step which comprises reacting 3,4-dichloro-1-butene with dipropylamine in the proportion of at least six moles of dipropylamine per mole of 3,4-dichloro-1-butene.

10. As new compositions of matter the 1-butene-3,4-bis-dialkylamines, the alkyl groups of which are low molecular groups.

GLEN H. MOREY.

REFERENCES CITED

The following references are of record in the file of this patent:

UNITED STATES PATENTS

| Number | Name | Date |
|---|---|---|
| 2,172,822 | Tamele | Sept. 12, 1939 |
| 2,216,548 | Converse | Oct. 1, 1940 |

OTHER REFERENCES

Beilstein, Handbuch der Organische Chemie, 4th ed., vol. IV, 2nd Supp., pages 713-714.

Beilstein, Handbuch der Organische Chemie, 4th ed., vol. IV, 1st Supp., pages 423-424.

Beilstein, Handbuch der Organische Chemie, 4th ed., page 273.

Chem. Abstracts, vol. 27, page 3919 (1933).